United States Patent [19]
Kaneko et al.

[11] Patent Number: 5,687,656
[45] Date of Patent: Nov. 18, 1997

[54] DENITRATION APPARATUS FOR A CAOL-FIRED BOILER

[75] Inventors: Shozo Kaneko; Norihisa Kobayashi, both of Tokyo; Kouhei Suyama; Atsushi Morii, both of Nagasaki, all of Japan

[73] Assignee: Mitsubishi Jukogyo Kabushiki Kaisha, Tokyo, Japan

[21] Appl. No.: 547,125

[22] Filed: Oct. 24, 1995

[30] Foreign Application Priority Data

Oct. 25, 1994 [JP] Japan .................. 6-260254

[51] Int. Cl.$^6$ .................. F23J 3/00
[52] U.S. Cl. .................. 110/216; 422/172
[58] Field of Search .................. 110/215, 216, 110/217; 422/171, 172, 176, 217, 228; 55/423

[56] References Cited

U.S. PATENT DOCUMENTS

| | | | |
|---|---|---|---|
| 3,208,411 | 9/1965 | Urban et al. | 110/215 |
| 4,048,927 | 9/1977 | Augustin et al. | 110/217 |

FOREIGN PATENT DOCUMENTS

| | | |
|---|---|---|
| 318 934 | 6/1989 | European Pat. Off. . |
| 600 440 | 6/1994 | European Pat. Off. . |
| 499 351 | 8/1994 | European Pat. Off. . |
| 2535837 | 5/1984 | France .................. 110/215 |
| 3732651 | 4/1989 | Germany . |
| 4135817 | 5/1993 | Germany . |

*Primary Examiner*—Noah P. Kamen
*Attorney, Agent, or Firm*—Wenderoth, Lind & Ponack

[57] ABSTRACT

An apparatus installed between a fuel economizer and an air preheater for the denitration of exhaust gas from a coal-fired boiler includes at least one vertical flue situated upstream of a reactor containing a denitration catalyst to cause an upward flow of the gas, A hopper is located below the vertical flue for collecting ash separated from the gas, A baffle is preferably provided in the flue to ensure the still more effective separation of ash from a gas.

2 Claims, 7 Drawing Sheets

• COARSE ASH
— GAS FLOW

FIG. 1

• COARSE ASH
— GAS FLOW

| CATALYST | GRANULAR TYPE | HONEYCOMB TYPE | PLATE TYPE |
|---|---|---|---|
| |  |  |  |

DENITRATION APPARATUS FOR A CAOL-FIRED BOILER

BACKGROUND OF THE INVENTION

1. Field of the Invention

This invention relates to a denitration apparatus employed in a coal-fired boiler.

2. Description of the Prior Art

Figure 4:
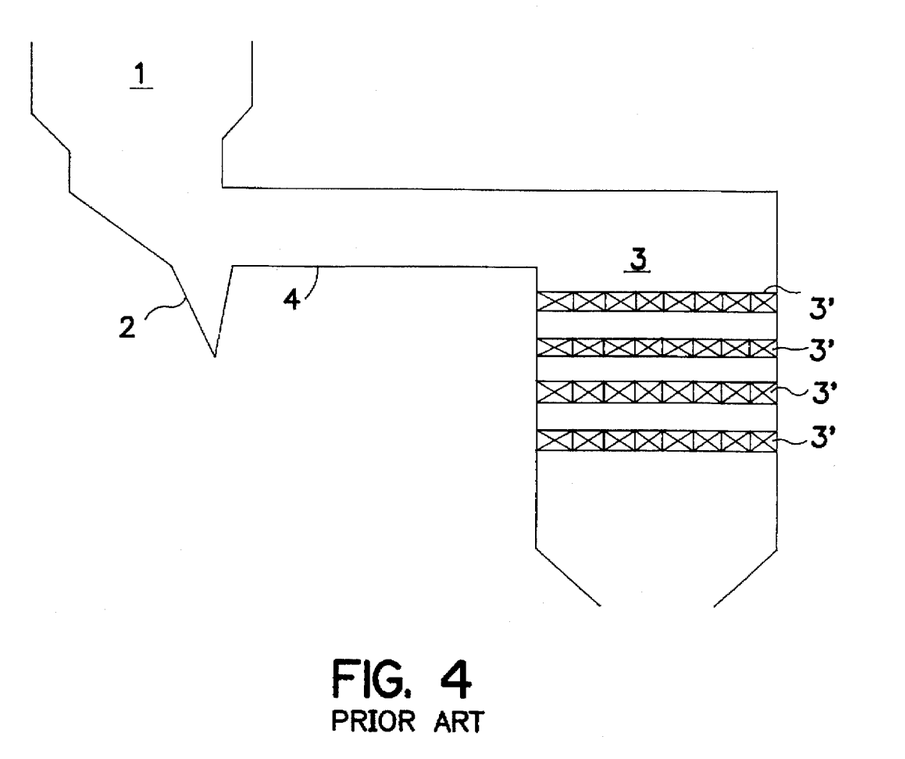
FIG. 4 is a view showing the layout of a known denitration apparatus for a coal-fired boiler.

A known denitration apparatus for a coal-fired boiler is usually installed between the exit of a fuel economizer and an air preheater, and comprises a denitration reactor 3 containing a denitration catalyst 3' and connected at its top to a horizontal flue 4, which is in turn connected to the exit of the fuel economizer in a boiler 1, as shown in FIG. 4. The fuel economizer has a hopper 2 at its exit.

Figure 6:
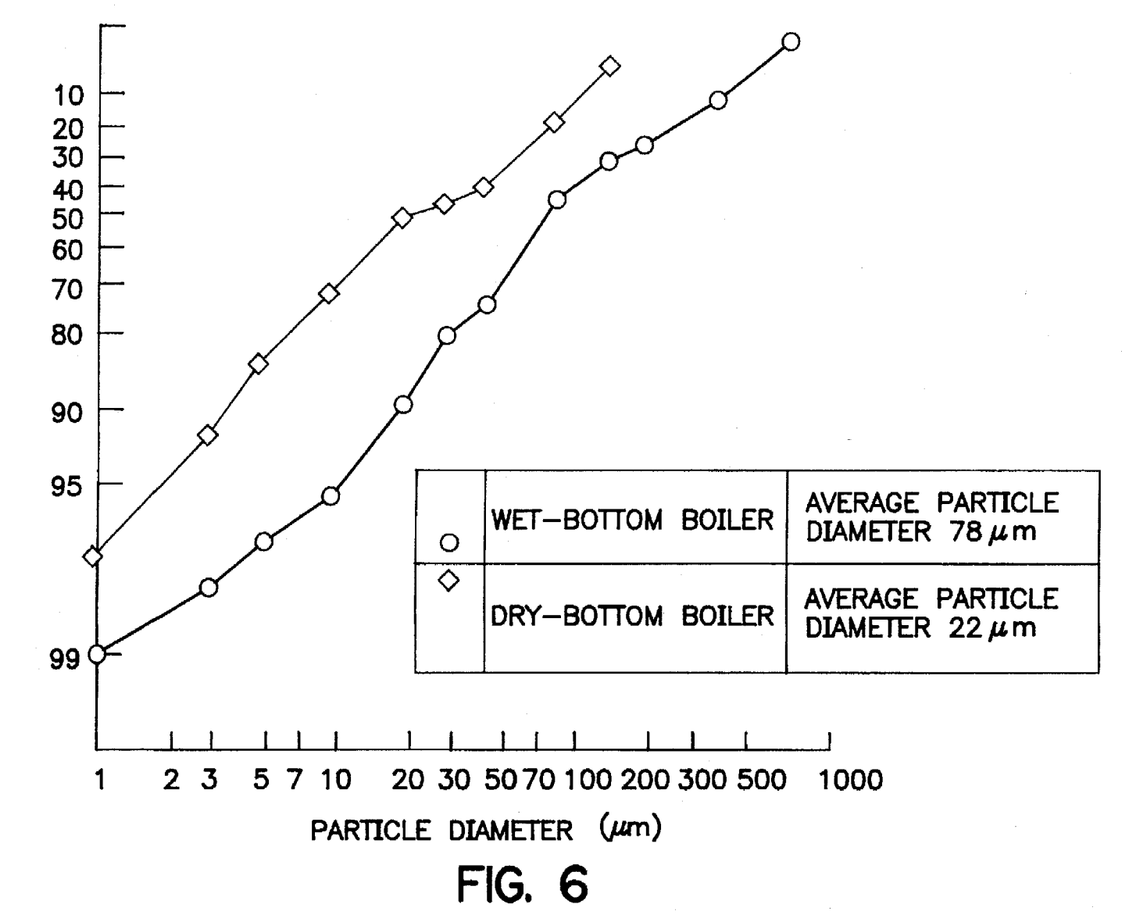
FIG. 6 is a graph comparing the particle diameter distributions of ash in the exhaust gases of a wet-bottom boiler and a dry-bottom boiler.

The exhaust gas of a coal-fired boiler contains several tens of grams of ash per $Nm_3$, but there has not been any clogging of the catalyst 3' in the denitration reactor 3 by any such ash, since the ash particles usually have a diameter not exceeding 1 mm, and even the largest particles have a diameter of, say, only 2 mm. The exhaust gas of a coal-fired wet-bottom boiler in which molten slag is dropped from a combustion furnace to be discharged, however, contains a large amount of coarse ash, as shown in FIG. 6 and Table 1. The dry-bottom boiler, which also appears in FIG. 6 and Table 1, is of the type in which combustion takes place at a high temperature and all the slag and ash, as well as combustion gases, are discharged from the combustion furnace.

Figure 7:
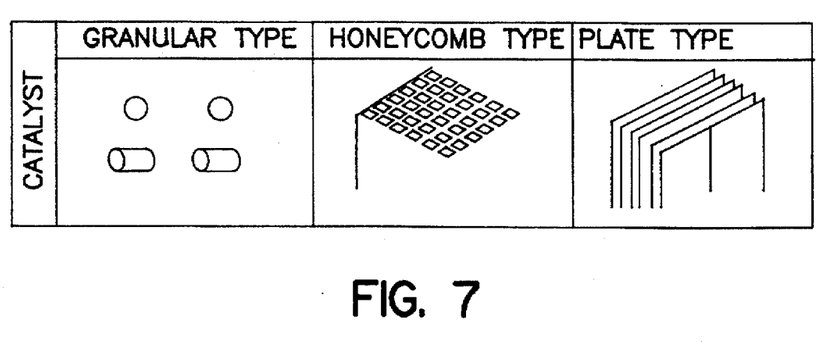
FIG. 7 is a view showing different forms of denitration catalyst.

The catalyst employed in the denitration reactor is usually of the honeycomb or plate type, though three types of catalyst are shown in FIG. 7. In the denitration apparatus, ammonia is injected into the exhaust gas to convert nitrogen oxide to harmless water and nitrogen in accordance with the following reaction with the aid of the catalyst:

$$4NO+4NH_3+O_2 \rightarrow 4N_2+6H_2O$$

Figure 5:
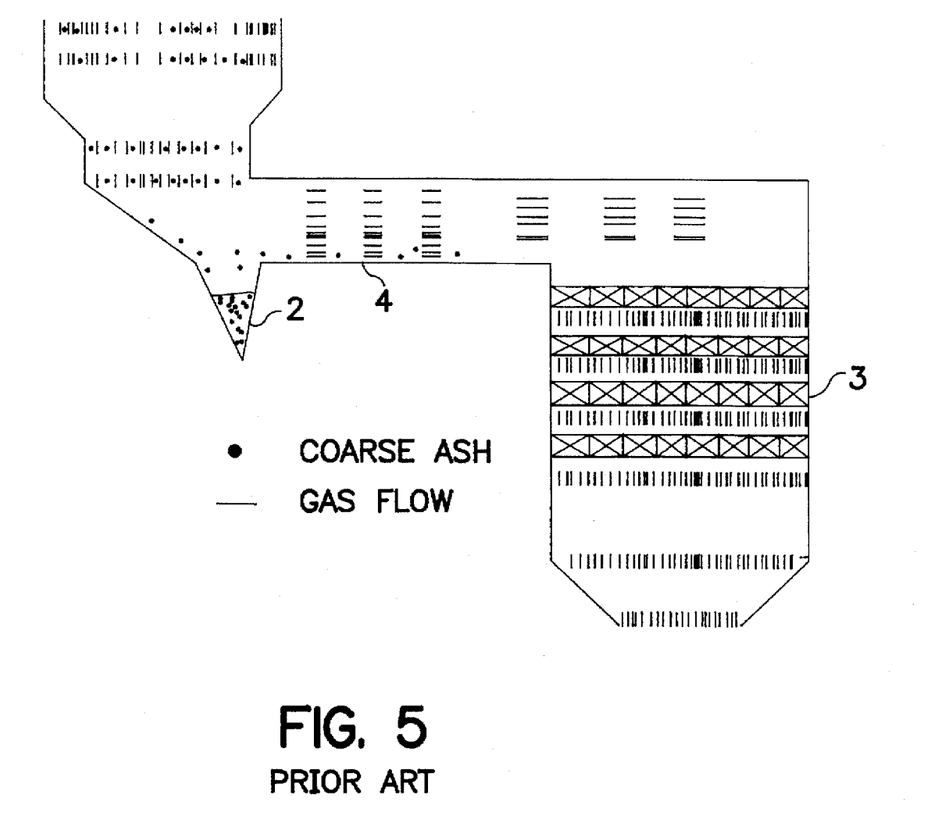
FIG. 5 is a view similar to FIG. 2, but showing the simulation of flow in the apparatus shown in FIG. 4.
Figure 8A:
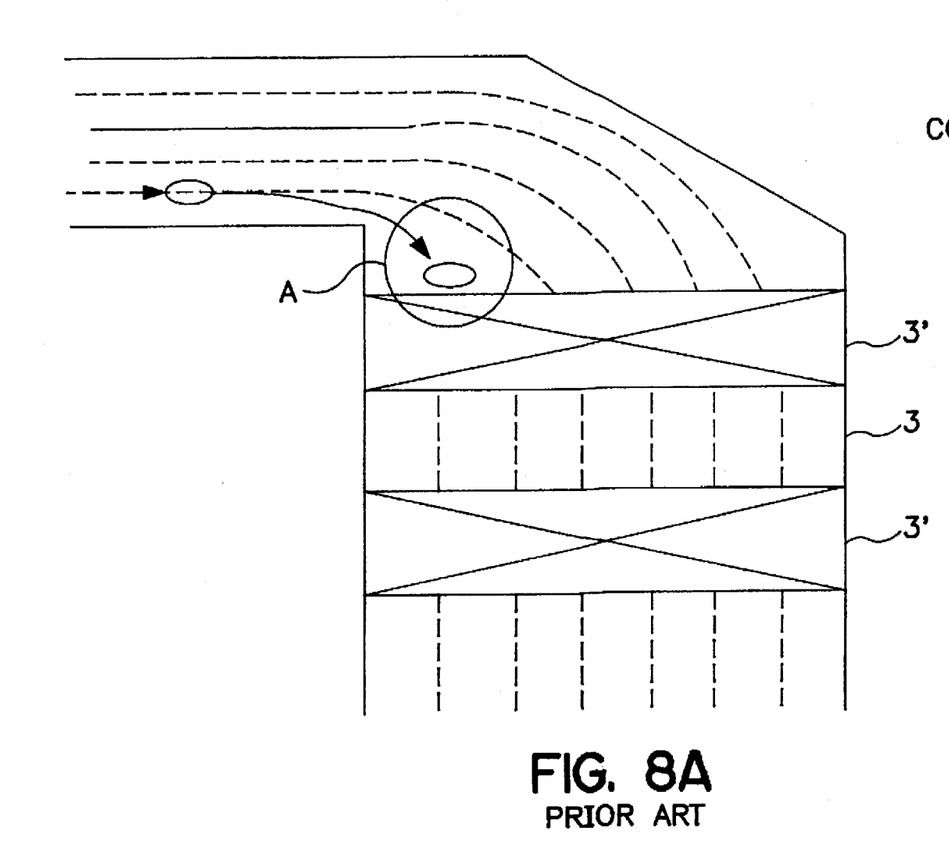
FIG. 8(a) is a view showing the deposition of ash in the denitration reactor in the known apparatus.
Figure 8B:
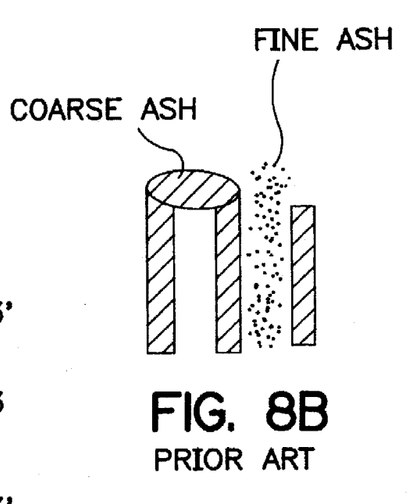
FIG. 8(b) is an enlarged view of part A of FIG. 8(a)

If the exhaust gas contains a large amount of coarse ash, however, the coarse particles leaving the boiler 1 shown in FIG. 4 flow horizontally through the flue 4 into the denitration reactor 3, though they are partly trapped in the hopper 2 at the exit of the fuel economizer, as shown in FIG. 5 showing the result of a simulation of gas flow in the apparatus shown in FIG. 4. The coarse ash particles reaching the denitration reactor 3 gather on the upstream side of the catalyst 3', as shown in FIG. 8(a), and prevent the exhaust gas from flowing smoothly into the denitration reactor 3, thereby lowering the performance of the apparatus, particularly when the boiler is of the wet-bottom type.

SUMMARY OF THE INVENTION

It is, therefore, an object of this invention to provide a denitration apparatus for a coal-fired boiler which enables the reliable and effective denitration of exhaust gas from the boiler by collecting coarse ash particles effectively to prevent them from flowing into a denitration reactor.

This object is attained by:

(1) a denitration apparatus for a coal-fired boiler which is installed between the exit of a fuel economizer and an air preheater and includes a denitration reactor, and which is characterized by including at least one vertical passage provided upstream of the reactor to cause an upward flow of gas, and a hopper located below the passage;

(2) an apparatus as set forth at (1) above, wherein the passage is provided with a baffle for separating ash from the gas;

(3) an apparatus as set forth at (2) above, wherein the baffle is a porous plate having a pore diameter which is smaller than the particle diameter of the ash;

(4) an apparatus as set forth at (1), (2) or (3) above, wherein the gas is caused to flow at a rate of 10 to 15 meters per second through the vertical passage;

(5) an apparatus as set forth at (3) above, wherein the baffle has a porosity of at least 60%; and

TABLE 1

| Sample | ~840 | 840~420 | 420~210 | 210~149 | 149~88 | 88~44 | 44~30 | 30~20 | 20~10 | 10~5 | 5~3 | 3~1 | 1~0.5 | 0.5~ |
|---|---|---|---|---|---|---|---|---|---|---|---|---|---|---|
| | | | | | Particle size (μm) | | | | | | | | | |
| Wet-bottom boiler | | | | | | | | | | | | | | |
| Weight (%) | — | 6.3 | 7.6 | 15.8 | 15.6 | 20.2 | 2.9 | 10.1 | 9.3 | 15.4 | 2.7 | 2.7 | 1.1 | 0.3 |
| Accumulated Weight (%) | — | 6.3 | 13.9 | 29.7 | 45.3 | 65.5 | 68.4 | 78.5 | 87.8 | 93.2 | 95.9 | 98.6 | 99.7 | 100 |
| Dry-bottom boiler | | | | | | | | | | | | | | |
| Weight (%) | — | — | — | 4.9 | 12.9 | 21.3 | 5.7 | 6.7 | 20.4 | 12.9 | 7.2 | 5.3 | 1.5 | 1.2 |
| Accumulated Weight (%) | — | — | — | 4.9 | 17.8 | 39.1 | 44.8 | 51.5 | 71.9 | 84.8 | 92.0 | 97.3 | 98.8 | 100 |

(6) a method of operating an apparatus as set forth at (1), (2) or (3), which is characterized by causing the gas to flow at a rate of 10 to 15 meters per second through the vertical passage.

The coarse particles of ash which the exhaust gas of the boiler contains are effectively removed from the gas flowing up the vertical passage at a rate of preferably 10 to 15 meters per second, and are collected in the hopper. Therefore, there is no fear of coarse particles of ash entering the denitration reactor, and the denitration apparatus always remains effective and reliable.

The baffle ensures a still more effective removal of ash. If it is a porous plate having a pore diameter which is smaller than the diameter of ash particles to be removed, the baffle ensures the effective separation of any ash particles coarser than its pores.

DETAILED DESCRIPTION OF THE INVENTION

Figure 1:
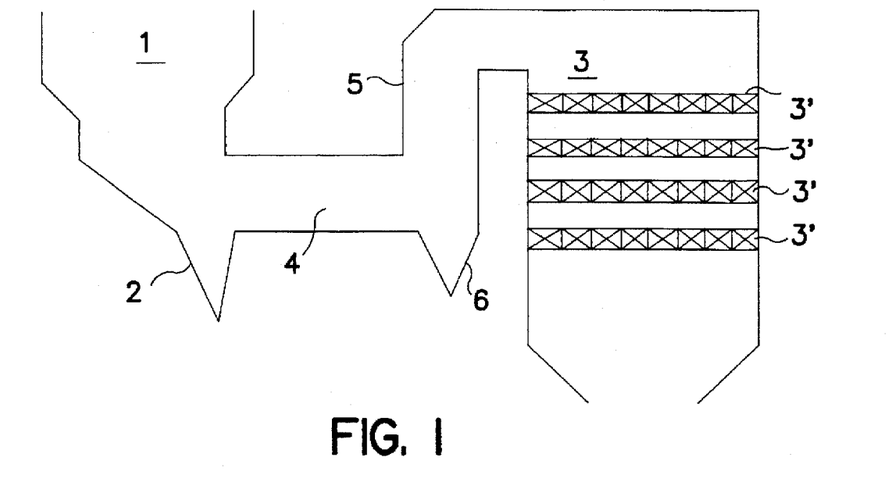
FIG. 1 is a view showing the layout of an apparatus embodying this invention.

An apparatus embodying this invention is shown in FIG. 1. It has a vertical flue 5 having a lower end connected to the downstream end of a horizontal flue 4 and an upper end connected to the top of a denitration reactor 3, thereby defining a vertical passage for an upward flow of gas from the horizontal flue to the reactor, while a hopper 6 is provided below the vertical flue 5. In any other portion thereof, the apparatus is identical in construction to the known apparatus shown in FIG. 4. Therefore, like numerals are used to indicate like parts in FIGS. 1 and 4, and no repeated description is made of any common parts.

The exhaust gas of the boiler 1 is caused to flow at a rate of 10 to 15 meters per second through the horizontal and vertical flues 4 and 5. Despite its high flow rate as stated, the vertical flue 5 in which the gas is directed to flow upwardly makes it possible to separate coarse particles of ash from the gas and thereby prevent any clogging of the catalyst 3" in the denitration reactor 3 that would give rise to a reduction in efficiency of the denitration reaction.

A minimum flow rate of 10 meters per second is highly desirable to prevent the deposition of ash in the denitration reactor 3, while a maximum flow rate not exceeding 15 meters per second is recommended to avoid any wear that ash might cause on the walls of the flues 4 and 5.

Figure 2:
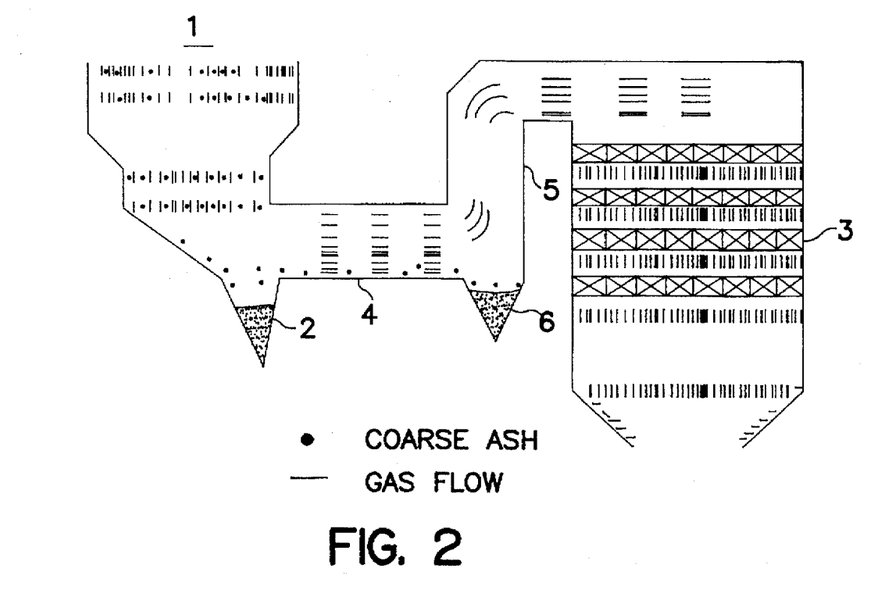
FIG. 2 is a view showing the result of a simulation of the flow of gas containing coarse ash particles in the apparatus shown in FIG. 1.

FIG. 2 shows a simulated flow of gas containing coarse ash particles discharged from the boiler when it is of the wet-bottom type. As is obvious from FIG. 2, coarse ash particles are effectively collected in the hopper 2 at the exit of the fuel economizer and in the hopper 6 below the vertical flue 5, and only the gas from which the coarse particles have thoroughly been removed enters the denitration reactor 3.

Figure 3:
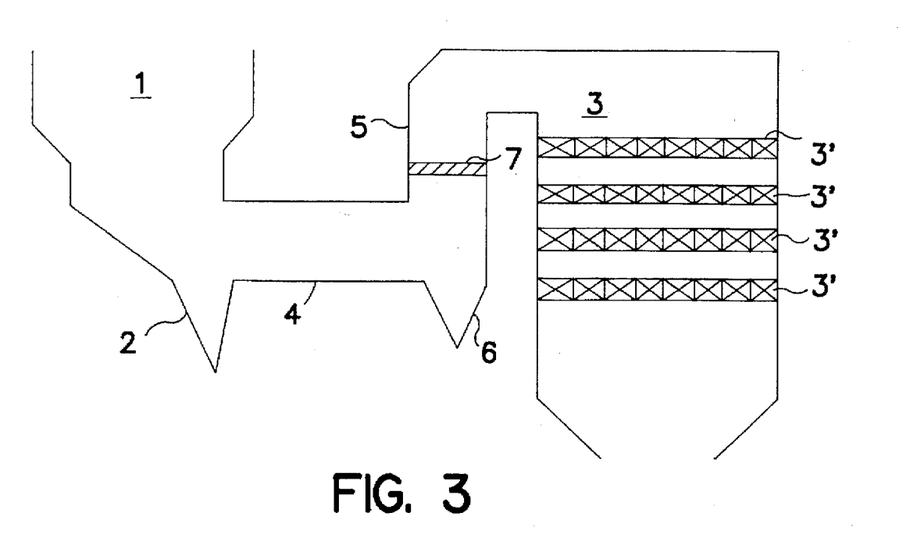
FIG. 3 is a view similar to FIG. 1, but showing a modified form of apparatus.
Figure 9:
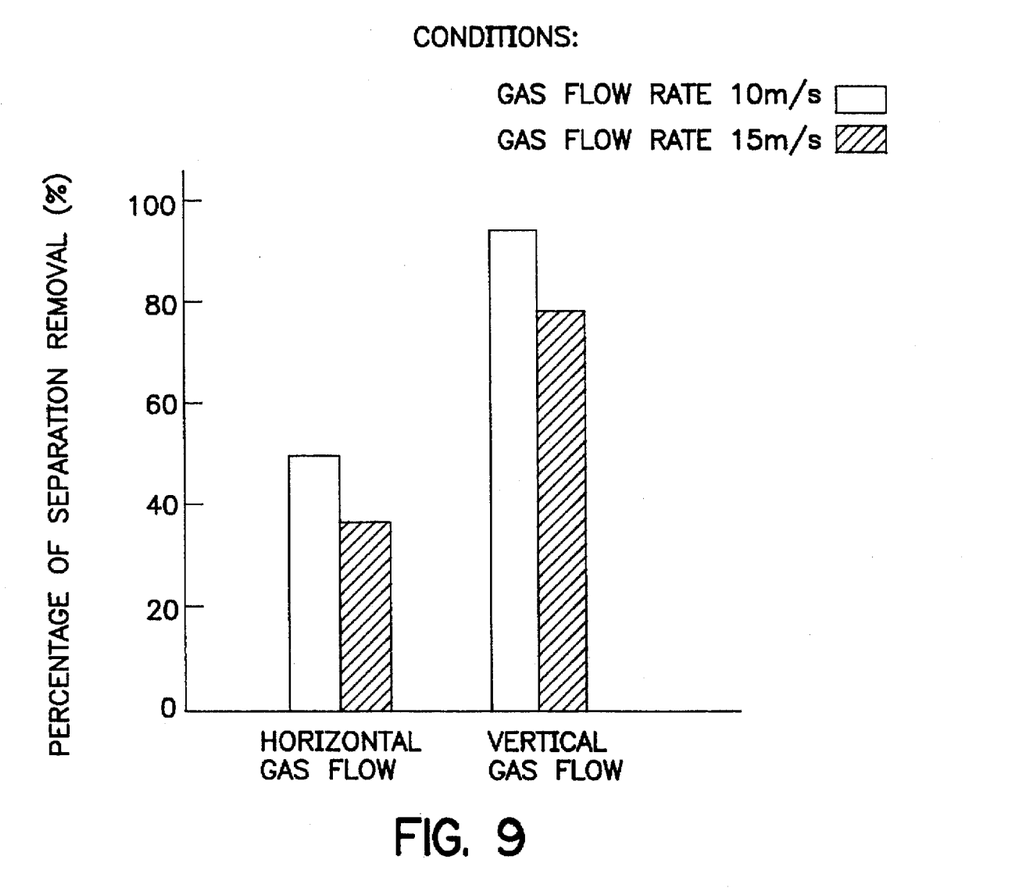
FIG. 9 is a graph comparing the separation of coarse ash particles having a diameter of 2 mm or more.

Although the flow rate of the gas in the vertical flue 5 may be as high as 10 to 15 meters per second, the upward flow of the gas therein enables the removal of at least 80% of coarse ash particles having a diameter of 2 mm or more, which is a drastic improvement over the separation of coarse ash particles from a horizontal flow of gas, as is obvious from FIG. 9. Moreover, the high flow rate of gas in the vertical flue 5 makes it possible to reduce its cross section and thereby the cost of its construction A modified form of apparatus embodying this invention is shown in FIG. 3. It is substantially identical to the apparatus shown in FIG. 1, but further includes a baffle 7 provided across the vertical flue 5 for stopping ash. The baffle 7 comprises a porous plate having a porosity of at least 60% to ensure a small pressure loss of the gas flowing therethrough. It has a pore diameter which is smaller than the diameter of ash particles to be removed. Thus, the baffle 7 can separate any and all ash particles larger than its pores from the gas flowing through the flue 5.

Tests have been conducted by employing baffles having different porosities to determine the pressure loss caused by those baffles. The results are shown in Table 2 below.

TABLE 2

| Porosity (%) | Pressure loss |
|---|---|
| 70 | 90 |
| 60 | 100 (standard) |
| 50 | 120 |
| 40 | 150 |
| 30 | 200 |

As is obvious from Table 2, the baffles having a porosity lower than 60% cause a sharply increasing pressure loss. Thus, the baffle 7 according to this invention has a porosity of at least 60%.

Although the baffle has been described as comprising a porous plate, it is alternatively possible to use a different form of baffle without departing from the scope and spirit of this invention. It is also to be understood that, though the apparatus shown in FIGS. 1 and 3 have both been shown as having a single vertical flue, they may alternatively have a plurality of vertical flues.

What is claimed is:

1. A coal-fired boiler arrangement, comprising:

a coal fired boiler;

a fuel economizer connected with said coal fired boiler, said fuel economizer having an exit;

a horizontal passage having an upstream end connected at said exit and a downstream end;

an air preheater; and an exhaust gas denitration apparatus installed between said downstream end and said air preheater, said denitration apparatus including a denitration reactor, at least one vertical passage provided upstream of and immediately preceding said denitration reactor so as to cause an upward flow of exhaust gas, and a hopper located below said at least one vertical passage, wherein said one vertical passage extends upwardly from said downstream end of said horizontal passage to said denitration reactor.

2. A method of operating a denitration apparatus for a coal-fired boiler, the denitration apparatus being installed between the exit of a fuel economizer and an air preheater, said method comprising the steps of:

passing gas from the fuel economizer upwardly through at least one vertical passage, the at least one vertical passage having a hopper located therebelow;

passing gas from the top of the at least one vertical passage to an inlet of a denitration reactor;

wherein the gas is passed upwardly through the at least one vertical passage at a flow rate of 10 to 15 meters per second, whereby ash is separated from the gas and collected in the hopper; and blocking ash, in the vertical passage, from reaching the denitration reactor with a porous plate having a pore diameter smaller than a predetermined particle diameter of the ash.

* * * * *

REEXAMINATION CERTIFICATE (3997th)

United States Patent
Kaneko et al.

[11] B1 5,687,656
[45] Certificate Issued Feb. 15, 2000

[54] DENITRATION APPARATUS FOR A COAL-FIRED BOILER

[75] Inventors: Shozo Kaneko; Norihisa Kobayashi, both of Tokyo; Kouhei Suyama; Atsushi Morii, both of Nagasaki, all of Japan

[73] Assignee: Mitsubishi Jukogyo Kabushiki Kaisha, Tokyo, Japan

Reexamination Request:
No. 90/005,142, Oct. 2, 1998

Reexamination Certificate for:
Patent No.: 5,687,656
Issued: Nov. 18, 1997
Appl. No.: 08/547,125
Filed: Oct. 24, 1995

[30] Foreign Application Priority Data

Oct. 25, 1994 [JP] Japan ................................. 6-260254

[51] Int. Cl.⁷ ......................................................... F23J 3/00
[52] U.S. Cl. ............................................ 110/216; 422/172
[58] Field of Search ...................................... 110/216, 215, 110/217; 422/171, 172, 176, 217, 228; 55/423

[56] References Cited

FOREIGN PATENT DOCUMENTS 2724176   4/1990   Japan .

OTHER PUBLICATIONS

EPRI Paper, Design of 700 MW Coal–Fired Supercritical Power Plant for Hekinan Thermal Power Station Units Nos. 1, 2, and 3, by S.Takegami, 2nd International Conference on Improved Coal–Fired Power Plants, Nov. 1988.

Mitsubishi Heavy Industry, Design of Coal Fired Supercritical Sliding Pressure Operaton Boiler for Unit No. 1 of Hekinan Power Station, MHI Techinical Review vol. 26, No. 6, Nov. 1989.

*Primary Examiner*—Noah Kamen

[57] ABSTRACT

An apparatus installed between a fuel economizer and an air preheater for the denitration of exhaust gas from a coal-fired boiler includes at least one vertical flue situated upstream of a reactor containing a denitration catalyst to cause an upward flow of the gas, A hopper is located below the vertical flue for collecting ash separated from the gas, A baffle is preferably provided in the flue to ensure the still more effective separation of ash from a gas.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claim 2 is determined to be patentable as amended.

New claims 3–12 are added and determined to be patentable.

2. A method of operating a denitration apparatus for a coal-fired boiler, the denitration apparatus being installed between the exit of a fuel economizer and an air preheater, said method comprising the steps of:
 passing gas from the fuel economizer *through a horizontal passage and then* upwardly through at least one vertical passage, the at least one vertical passage having a hopper located therebelow;
 passing gas from the top of the at least one vertical passage to an inlet of a denitration reactor;
 wherein the gas is passed *horizontally through the horizontal passage at a flow rate of 10 to 15 meters per second and then* upwardly through the at least one vertical passage at a flow rate of 10 to 15 meters per second, whereby ash is separated from the gas and collected in the hopper; and
 blocking ash, in the vertical passage, from reaching the denitration reactor with a porous plate having a pore diameter smaller than a predetermined particle diameter of the ash.

3. *The method of claim 2, and further comprising trapping ash in a further hopper located at the exit of the fuel economizer.*

4. *The method of claim 2, wherein at least 80% of coarse ash particles having a diameter of two millimeters or more are removed from the gas between the horizontal passage and the denitration reactor by passing the gas vertically through the passage at a rate of 10 to 15 meters per second.*

5. *The method of claim 2, wherein the flow rate of 10 meters per second through the horizontal passage and through the at least one vertical passage is a minimum flow rate, and the flow rate of 15 meters per second through the horizontal passage and through the at least one vertical passage is a maximum flow rate.*

6. *A method of operating a denitration apparatus with a coal-fired boiler comprising:*
 *combusting coal and passing the combustion gas through a coal fired boiler so as to produce an exhaust gas;*
 *passing the exhaust gas through a fuel economizer connected with said coal fired boiler and then to an exit of said fuel economizer;*
 *passing the exhaust gas through a horizontal passage having an upstream end connected at said exit and a downstream end at a flow rate of 10 to 15 meters per second;*
 *passing the exhaust gas from the horizontal passage to an exhaust gas denitration apparatus installed between said downstream end and an air preheater, said denitration apparatus including a denitration reactor, the exhaust gas passing upwardly through a vertical passage provided upstream of and immediately preceding said denitration reactor at a flow rate of 10 to 15 meters per second, whereby ash is separated from the exhaust gas and collected in a hopper located below the vertical passage, and so as to cause a flow of the exhaust gas to the top of the vertical passage and then to an inlet of the denitration reactor; and*
 *passing the exhaust gas through a porous plate in the vertical passage and blocking ash from reaching the denitration reactor, said porous plate having a pore diameter smaller than a predetermined particle diameter of the ash, and separating the ash from the exhaust gas and collecting the ash in said hopper located below said vertical passage and upstream of said porous member, wherein said vertical passage extends upwardly from said downstream end of said horizontal passage to said denitration reactor.*

7. *The method of claim 6, wherein said porous plate member has a porosity of at least 60%.*

8. *The method of claim 6, wherein said porous member is a porous plate.*

9. *The method of claim 6, wherein said combusting comprises combusting coal in a combustion furnace and dropping molten slag into a coal fired wet-bottom boiler.*

10. *The method of claim 9, and further comprising trapping ash in a further hopper located at the exit of the fuel economizer.*

11. *The method of claim 6, wherein at least 80% of coarse ash particles having a diameter of two millimeters or more are removed from the gas between the horizontal passage and the denitration reactor by passing the gas vertically through the passage at a rate of 10 to 15 meters per second.*

12. *The method of claim 6, wherein the flow rate of 10 meters per second through the horizontal passage and through the at least one vertical passage is a minimum flow rate, and the flow rate of 15 meters per second through the horizontal passage and through the at least one vertical passage is a maximum flow rate.*

\* \* \* \* \*